United States Patent [19]

Martin

[11] Patent Number: 5,991,712
[45] Date of Patent: *Nov. 23, 1999

[54] METHOD, APPARATUS, AND PRODUCT FOR AUTOMATIC GENERATION OF LEXICAL FEATURES FOR SPEECH RECOGNITION SYSTEMS

[75] Inventor: Paul A. Martin, Arlington, Mass.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,802

[22] Filed: Dec. 5, 1996

[51] Int. Cl.$^6$ .................................................. G06F 17/27
[52] U.S. Cl. .................................................. 704/9; 704/10
[58] Field of Search .................................. 704/257, 9, 10, 704/1

[56] References Cited

U.S. PATENT DOCUMENTS

| | | |
|---|---|---|
| 4,864,623 | 9/1989 | Van Nes et al. ............................ 381/43 |
| 4,942,526 | 7/1990 | Okajima et al. .......................... 364/419 |
| 4,984,178 | 1/1991 | Hemphill et al. . | 
| 5,424,947 | 6/1995 | Nagao et al. ....................... 364/419.08 |
| 5,457,768 | 10/1995 | Tsuboi et al. ............................ 704/231 |
| 5,475,588 | 12/1995 | Schabes et al. . |
| 5,642,519 | 6/1997 | Martin ..................................... 395/759 |
| 5,729,659 | 3/1998 | Potter ....................................... 704/270 |

OTHER PUBLICATIONS

Holmes"Speech Synthesis and Recognition" Chapman Hill pp.156, 157, 1995.

Gorin et al., An Experiment in Spoken Language Acquistion, IEE Transactions on Speech and Audio Processing, vol. 2 No. 1Part II, Jan. 1994.

Gorin, A.L., et al., "An Experiment in Spoken Language Acquisitions," IEEE Transactions of Speech and Audio Processing, vol. 2, No. 1, Part II, Jan. 1994, pp. 224–240.

*Primary Examiner*—David R. Hudspeth
*Assistant Examiner*—Harold Zintel
*Attorney, Agent, or Firm*—Finnegan, Henderson, Farabow, Garrett & Dunner, L.L.P.

[57] ABSTRACT

Improved word accuracy of speech recognition can be achieved by providing a scheme for automatically limiting the acceptable word sequences. Speech recognition systems consistent with the present invention include a lexicon database with words and associated lexical properties. The systems receive exemplary clauses containing permissible word combinations for speech recognition, and identify additional lexical properties for selected words in the lexicon database corresponding to words in the received exemplary clauses using lexical property tests of a grammar database. Certain lexical property tests are switchable to a disabled state. To identify the additional lexical properties, the exemplary clauses are parsed with the switchable lexical property tests disabled to produce an index of the lexical properties corresponding to the exemplary clauses. The lexicon database is updated with the identified additional lexical properties by assigning the lexical properties to the corresponding words of the lexicon database. The grammar database is compiled with the lexical property tests enabled and the lexicon database with the assigned lexical properties to produce a grammar that embodies constraints of the lexical property tests and the lexical properties.

21 Claims, 4 Drawing Sheets

METHOD, APPARATUS, AND PRODUCT FOR AUTOMATIC GENERATION OF LEXICAL FEATURES FOR SPEECH RECOGNITION SYSTEMS

BACKGROUND OF THE INVENTION

A. Related Applications

This application is related to U.S. Ser. No. 08/235,046, entitled "Speech Interpreter With A Unified Grammar Compiler," filed Apr. 29, 1994 now U.S. Pat. No. 5,642,519, and incorporated herein by reference.

B. Field of the Invention

This invention relates generally to speech comprehension and, more particularly, to voice-activated command and control systems. The present invention facilitates the process of recognizing speech by automatically eliminating many nonsensical word sequences from consideration.

C. Description of the Related Art

Speech recognition systems generally include two main elements: a speech recognizer and an interpreter. The speech recognizer converts sound input into sequences of words. The interpreter then tries to understand the input by determining the relevant meaning of the words.

To achieve useful recognition rates, conventional speech recognition systems impose constraints other than word lists, such as by specifying a grammar that delineates allowable or acceptable word sequences or by providing statistical likelihoods for word sequences.

Programmers build the grammars by hand or with rule compilers as context-free formalisms determining the acceptable word sequences. Hand-built grammars generally provide fine control over the word sequences recognized, but their construction is difficult and painstaking, even for the relative few who are initiated in the art.

The statistical models, on the other hand, use tables of the probabilities of each word (unigram), each word pair (bigram), and each word triple (trigram). Some researchers have experimented with extending the statistical systems to include n-grams where "n" is higher than 3, but generally they only express the probabilities of adjacent words. Statistical grammars are built automatically by simply running an analysis program over an appropriate collection of the kinds of sentences that one wishes to recognize. A prime example of this technology is the ARPA-funded Wall Street Journal dictation project. In that project researchers train on the text of previously-printed articles from the Wall Street Journal and test them on text read from a later edition of the Journal. Unfortunately, the database of Wall Street Journal text used in these experiments contains approximately 44 million words, and some of the researchers using this database have indicated that their speech recognition systems would work better with a more complete training set.

In the domain of voice-activated command and control systems, one use for a speech recognition system, the utterances to be recognized do not correspond directly to any existing body of text that could be used analogously to the Wall Street Journal text's role in training the dictation recognizers. Traditional statistical modeling requires a huge database of expected utterances. Statistical models do not have any abstraction of the words, so the actual co-occurrence of words is necessary to count the relative frequency of each. This means that any word pair that does not occur in the training data would be assigned the most unlikely bigram probability.

One application for a voice-activated command and control system allows speakers to query the contents of a computerized catalog of products. Such an application requires a grammar that recognizes action words and phrases, such as "can you show me <item>?" or "what <item> do you carry?" in a spoken query, with the speaker supplying a phrase that specifies the item of interest. One over-simplified grammar of such item specification phrases would allow any basic item such as "pants" to be modified by any combination of style family, pattern style, color, size, gender, age, fabric type, fabric style, maker's name, etc. A particular sweater could thus be called "the petite women's medium pink jewel-neck cashmere fine-knit 'drifter' sweater." Such an accepting grammar could perform at acceptable levels for extracting the meaning of an input word combination from a written form of the item description.

The perplexity of the grammar produced by the cross-product of all these choices is, however, so large that the word accuracy of the speech recognition becomes uselessly low when such a loosely constrained grammar is used. The speech recognition system would accept phrases that no user would ever utter, for example, "the casual cashmere diaper bag."

If a lexicon contained lexical or word entries for every modifier marked with a feature containing the set of things it could realistically modify, or a set of classes of things, then the grammar could be written to allow only the reasonable or acceptable combinations and to rule out the ridiculous ones that should be omitted. This would in turn reduce the perplexity created by loosely constrained grammars. With a grammar compiler that accepts such restrictions based on features in the lexicon, such a markup seems like a possible solution. The grammar could, for instance, record classes of basic items, noting that, for example, "chinos" and "jeans" are "tough clothing" and then only allow them to be associated with fabrics appropriate for "tough" clothes. This would block "lace chinos" but allow "silk blouse" and "denim jeans." The disadvantage of this approach is that it requires a grammar writer to figure out and record the features that determine allowable modifiers as well as a large amount of detailed work to make the annotations in the lexicon.

Although a loosely constrained grammar permits recognition of unacceptable word sequences, tighter constraints based on exactly the items in the catalog would refuse certain acceptable word sequences. Such a system would not recognize combinations of modifiers and basic items that, while reasonable to the speaker, are not specified exactly in the catalog. For example, if the catalog had "canvas jackets" and "denim jeans" but no "denim jackets," then the speech recognition system with such a restricted grammar built from only catalog item descriptions could not understand the phrase "denim jacket." Presented with those sounds, the system might produce something like the "d'women jacket" pronunciation of "the women['s] jacket," but it could not understand what the user said, i.e., interpret what the user said into a hypothetical catalog item. This would be baffling to a naive user of the system, especially since rephrasing his request to include "a jacket made of denim" would also fail.

There is therefore a need for a speaker-independent speech recognition system for a multitude of command and control applications that uses a flexible grammar to limit acceptable word sequences in a manner that improves word accuracy in the speech recognition process.

SUMMARY OF THE INVENTION

Accordingly, embodiments of the present invention are directed to a method, apparatus, and product that substantially obviates one or more of the problems due to limitations, shortcomings, and disadvantages of the related art.

In accordance with the present invention, as embodied and broadly described herein, improved word accuracy for speech recognition can be achieved by providing a scheme for automatically limiting the acceptable word sequences or the word sequences discernable during the speech recognition process. According to one aspect of the present invention, a method, apparatus, and computer program product for automatically modifying a lexicon database containing words and associated lexical properties is comprised of a number of operations, including receiving exemplary clauses containing permissible word combinations for speech recognition, and identifying additional lexical properties for selected words in the lexicon database corresponding to words in the received exemplary clauses using lexical property tests of a grammar database. The exemplary clauses indicate the types of word sequences to be understood during a speech recognition process. Certain lexical property tests are switchable to a disabled state. To identify the additional lexical properties, the exemplary clauses are parsed with the switchable lexical property tests disabled to produce an index of the lexical properties for words in the exemplary clauses. The lexicon database is updated with the identified additional lexical properties by assigning the lexical properties to the corresponding words of the lexicon database. The grammar database is compiled with the lexical property tests enabled and the lexicon database with the assigned lexical properties to produce a grammar that embodies constraints of the lexical property tests and the lexical properties.

According to another aspect of the present invention, a method, apparatus, and computer program product for speech recognition involves a lexicon database containing words and associated lexical properties and a grammar database with lexical property tests. Certain lexical property tests are switchable between a disabled state and an enabled state. Consistent with this aspect of the invention, an input speech pattern contains a word sequence that is parsed using the switchable lexical property tests in the enabled state. This permits the identification of a command corresponding to the parsed word sequence and, in turn, initiation of the command to instruct a processor to perform an operation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

A. Overview

Systems consistent with the present invention automatically limit the number of acceptable word sequences by employing an interpreter that uses rules for parsing a set of word sequences to identify additional lexical properties of words in the set that can be used during a recognition process to discern acceptable word sequences. The system performs two distinct functions. The first involves building the set of acceptable word sequences. The second uses those word sequences to recognize spoken input.

B. Building A Set Of Acceptable Word Sequences

Figure 1:
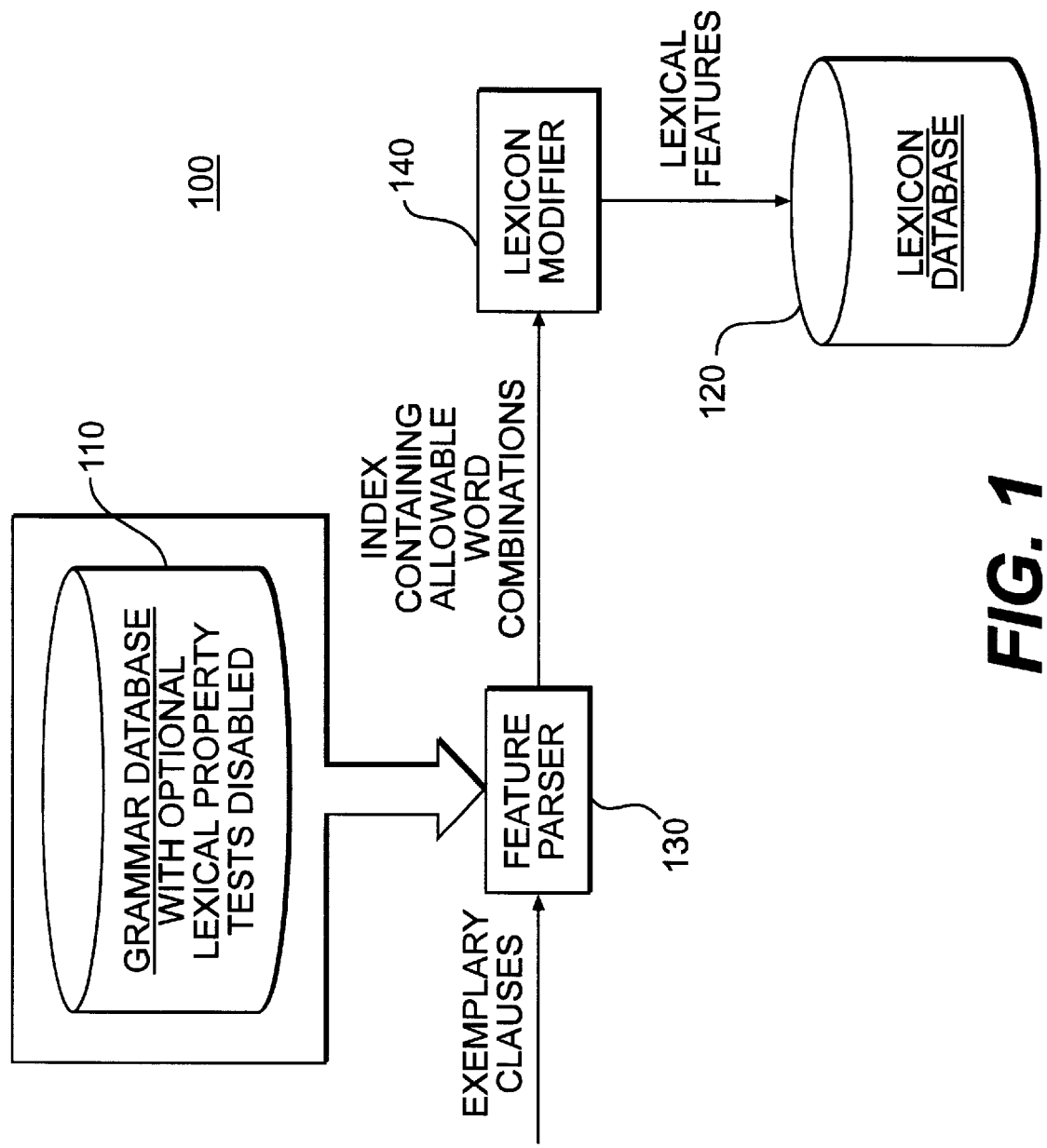
FIG. 1 is a block diagram showing the main components of a speech interpreter used to limit the number of recognizable word combinations.

In accordance with the present invention, speech interpreter 100 shown in FIG. 1 includes grammar database 110, lexicon database 120, feature modifier 130, and lexicon modifier 140. Interpreter 100 may be incorporated into systems such as command and control systems that instruct computers to perform specific functions in response to spoken input.

Grammar database 110 constitutes a set of restrictions defining both permissible and acceptable word sequences. Permissible word sequences come from parsing a set of exemplary sentences or clauses that represent word sequences the system should be able to recognize. Acceptable word sequences are the ones that, applying certain sequence rules and related constraints, correspond to word sequences that the system can interpret and take appropriate action.

The sequence rules and constraints help parse input word sequences according to specific rules that define conditions under which different words can be combined, for example, in a single sentence. A portion of one such rule is represented as follows:

[material][item].

This rule alone means that any word defined in lexicon database 120 with a "material" type may appear before any word of the "item" type. Both are optional, as shown by the brackets ("[ ]") around each word, meaning that there is no absolute requirement that they be in this sequence. A word of the "item" type may be alone; so too may a word of the "material" type.

The constraints, however, dictate which specific words can be combined in accordance with a sequence rule. The constraints, called lexical property (or feature) tests, prescribe both the permissible and acceptable word sequences based on certain word annotations in lexicon database 120 that are characterized as "features" of the words. For example, only specific words of a "material" type may precede specific words of the "item" type based on requiring that they share certain compatible features.

Lexicon database 120 includes lexical entries of words and related annotations, some of which describe features of the words. Initially, the words of lexicon database 120 may be automatically generated from, for example, an input word set like a catalog or dictionary. Additionally, some of the annotations for the words are preset so the words can be differentiated by type. For example, a lexical entry for the word "sweater" from the input word set is initially annotated to indicate that the word represents an "item" type, and a lexical entry for the word "woolen" from the input word set is annotated to indicate the word represents a "material" type. Applying the grammar rule that permits material types to precede item types, without additional constraints, would result in "woolen sweater" as a permissible word sequence. But if "woolen" and "sweater" do not share a common feature required by a defined constraint on the combination of [material] and [item], then "woolen sweater" would not be an acceptable sequence.

Although this embodiment uses two databases (110 and 120), other configurations are possible as well, for example, one database with both a grammar and a lexicon can be used, as can distributed databases.

One purpose of interpreter 100 is to limit the permissible word sequences to only those considered to be acceptable. Systems employing interpreter 100 should be able to "hear" all permissible word sequences, but only understand those that are acceptable, i.e., those that include words having some meaningful relationship. For example, sequences that have no meaning, like "cashmere diaper bag," may be heard but not understood. Hearing such sequences would allow unacceptable perplexity in a speech recognizer but is not a problem in an interpreter that has words typed or previously recognized as its inputs. Perplexity is an issue only when dealing with the uncertainty of speech recognition. Thus, lexicon database 120 may dictate that "diaper bag" and "jeans" are of the "item" type with an annotation for a fabric feature defined as "sturdy." The word "cashmere" in lexicon database 120 is a "material" type with a "soft" fabric feature, while the word "denim" is also a "material" type and has a different fabric feature such as "sturdy." The combination of grammar database and lexicon database 120, with a "[material][item]" rule and constraint that only materials and items with common fabric features are acceptable sequences, would thus permit the combinations "denim diaper bag" and "denim jeans" but not "cashmere diaper bag" and "cashmere jeans."

Some of the lexical features in lexicon database 120 are derived automatically from pre-existing data, making the task of building lexicon database 120 easier, and the cost for adding new words much smaller. The pre-existing data, shown in FIG. 1 as the exemplary clauses directed into feature parser 130, corresponds to the permissible word sequences or speech input that the speaker would reasonable expect the system to recognize.

To derive features for lexicon database 120 automatically, feature parser 130 uses grammar database 110 to parse the exemplary clauses to determine the word sequences or, more particularly, features of selected words common to the clauses and lexicon database 120. In a grammar designed with rules using lexical features from pre-existing data, word combinations in the pre-existing data would be rejected if parsed with the rules enabled because the bare or incomplete lexicon would have only the types of the basic items such as a "diaper bag," without essential parts of the feature annotations. A system like this would reject reasonable combinations as unreasonable. For example, the bare lexicon database may include the word "diaper bag" as an item type, but only after processing the pre-existing data can the system determine that "diaper bag" item may be modified by certain material types like "denim." If the pre-existing data were parsed with all of the constraints enabled, the acceptable material types could not be identified because the relationships between item types and material types are not yet known when the pre-existing data is parsed.

This problem is avoided by allowing certain constraints of grammar database to be disabled when parsing exemplary clauses. Disabling certain lexical feature tests during parsing permits the system to capture information on permissible word sequences.

Therefore, feature parser 130 preferably determines whether a given constraint from grammar database 110 can be disabled during the parsing of exemplary clauses. Parser 130 can make this determination by testing an indicator or signal that indicates whether the constraint can be disabled. In the above example, the constraint requiring a material that precedes an item share a common fabric feature would be switchable.

It can be expressed in grammar database 110 as follows:

{ [material][item]
  where material.fabricType $\sim\epsilon$ item.fabricTypes }.

The "$\sim\epsilon$" indicator would mean the constraint could be disabled. Thus, when feature parser 130 parses input exemplary clauses, sequences like "denim diaper bag," "denim jeans," "cashmere diaper bag," and "cashmere jeans" would all be permissible sequences. When the fabric feature lexical test is later turned on it will block out the unacceptable sequences and allow only "denim diaper bag" and "denim jeans."

Indexing and then processing the results of the parsed clauses provides the information content needed to automatically mark-up or update the lexicon database with the results derived from the pre-existing data, for example, indicating the available blouse fabrics. Feature parser 130 builds the index of parsed clauses.

Lexicon modifier 140 performs the update function, modifying lexical entries in lexicon database 120 for each selected word to reflect the extracted features. In the "cashmere diaper bag" example, lexicon database 120 would be modified to reflect the information that the "diaper bag" item has a "sturdy" fabric feature, the same as "denim" material.

Once lexicon database 120 is enhanced with this information, the switchable constraints of grammar database 110 can be turned on for speech recognition or compilation of rules for use in speech recognition, as explained in detail in U.S. Ser. No. 08/235,046. When used in a speech recognition application, interpreter 110 will thus block "cashmere" from modifying "diaper bag" or "jeans," but allow the combinations "denim diaper bag" and "denimjeans."

Figure 2:
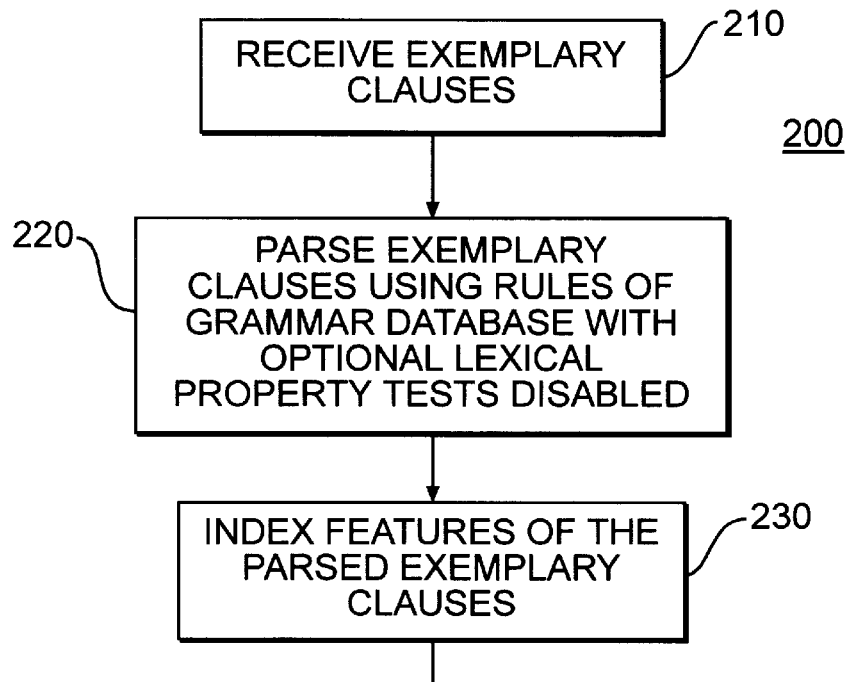
FIG. 2 is a flow diagram of the steps performed by the feature parser according to an implementation of the present invention.

FIG. 2 is a flow diagram of the preferred steps performed by feature parser 130. Feature parser 130 receives input exemplary clauses (step 210). Some clauses correspond to actual commands and some are merely logically possible, but are not acceptable. In the latter case, the system will notify the user after the recognition process, for example, by synthesized voice output, that an input does not correspond to an available command.

Feature parser 130 next parses the exemplary clauses with the switchable rules in grammar database 110 disabled to capture all possible features of selected words common to the exemplary clauses and lexicon database 120 (step 220). In an alternative configuration, feature parser 130 may capture features on words found in the exemplary clauses but not in lexicon database 120. With the exemplary clause, "petite women's medium pink jewel-neck cashmere fine-knit 'drifter' sweater," feature parser 130 determines whether all of the words preceding "sweater" can modify "sweater," in accordance with rules and related non-optional constraints from grammar database 110.

As feature parser 130 parses the exemplary clauses, it builds an index logically equivalent to a multidimensional matrix or array including selected words from lexicon database 120 and the features for those words identified from the context of the selected words used in the exemplary clauses (step 230). For example, feature parser 130 would include an index entry for "sweater" with a corresponding list of features and values such as: sizemod: "petite",
gendermod: "women's",
size: "medium",
color: "pink",
patternstyle: "jewel-neck",
fabric: "cashmere",
fabricmod: "fine-knit",
stylename: "drifter".

Figure 3:
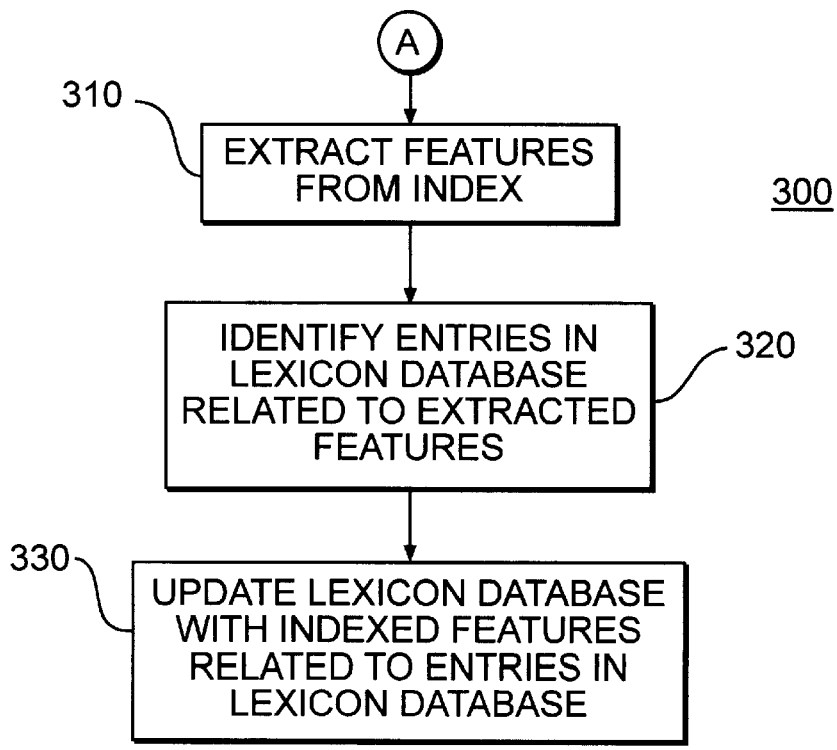
FIG. 3 is a flow diagram of the steps performed by the lexicon modifier according to an implementation of the present invention.

In one implementation of the present invention, lexicon modifier 140 performs the steps illustrated in the flow diagram of FIG. 3. As a first step, lexicon modifier 140 extracts features from the word-feature index built by feature parser 130 (step 310). Next, lexicon modifier 140 identifies the word entry in lexicon database 120 that exhibits the extracted feature (step 320). For each word in the index, lexicon modifier 320 modifies the lexicon entry accordingly to reflect the corresponding features for that word in the index (step 330). Thus, lexicon database 120 would be modified to indicate that "sweater" has possible feature values that would permit its combination with "petite", "women's", "medium", "pink", "jewel-neck", "cashmere", "fine-knit", "drifter" in rules like the "[material][item]" rule.

In this fashion, interpreter 100 extracts information from exemplary clauses to update lexicon database 120. By combining this information with the optional rules of grammar database 110 enabled during the speech recognition process, interpreter 100 can select from lexicon database 120 only the acceptable combinations, like the "petite sweater," but not the other possible one "jewel-neck jeans."

C. Recognizing Acceptable Word Combinations

Figure 4:
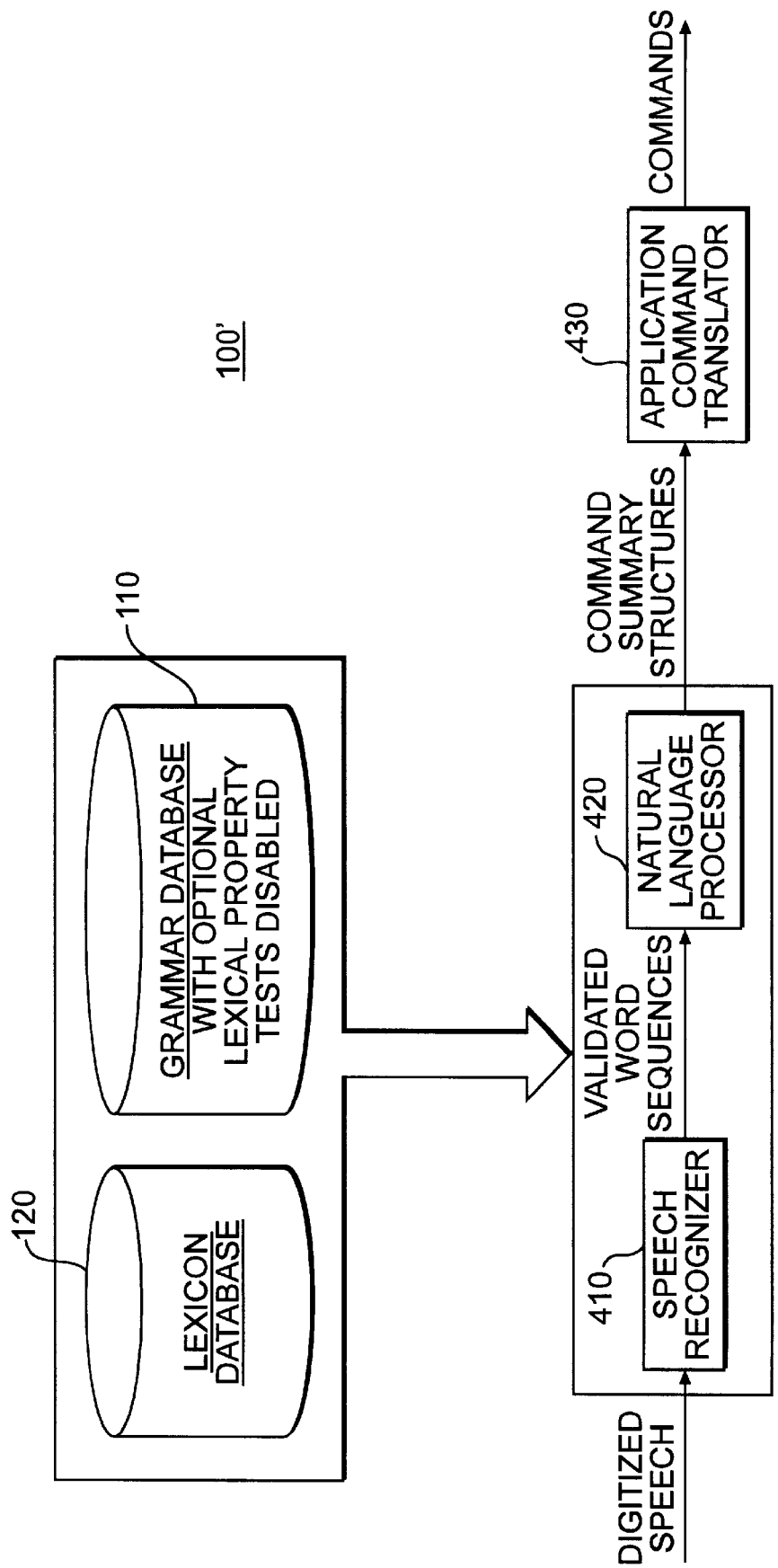
FIG. 4 is a block diagram showing the main components of a speech interpreter used to recognize acceptable word combinations.

FIG. 4 is a block diagram showing the main components of speech interpreter 100' used during the speech recognition process. As shown, grammar database 110 and lexicon database 120 are used to recognize acceptable word combinations. In this operation, however, the switchable rules of grammar database 110 are enabled to limit the permissible word combinations from lexicon database 120 to only the acceptable ones. Speech understanding generally requires the use of speech recognizer 410, natural language processor 420, and application command translator 430.

There are at least two ways of performing the recognition process. The first would be to compile grammar database 110 and lexicon database 120 to generate a speech recognition grammar and a natural language grammar, as explained in U.S. Ser. No. 08/235,046 with speech recognizer 410 using a speech recognition grammar compiled from the natural language grammar. Such a speech recognition grammar would reflect all the constraints imposed by enforcing the switchable restrictions. The natural language understanding is done by natural language processor 420 using the natural language grammar including only the acceptable word sequences.

An alternative mechanism to recognize spoken input in accordance with the separate grammar database 110 and lexicon database 120 involves applying the rules and feature tests during recognition. The first option offers the advantage of faster speech recognition but requires an extensive compilation process. The second approach, however, may be too computationally intensive for practical use with speech recognizers on current computers.

Speech recognizer 410 is preferably a Hark speech recognizer available from B.B.N., 70 Fawcett Street, Cambridge, Mass. 02138. Other commercially available speech recognizers may also be appropriate and interpreter 100 can be adapted by one skilled in the art to operate with different speech recognizers without departing from the spirit of the present invention. Examples of commercially available speech recognizers which operate with interpreter 100' include Texas Instruments' Dagger and Carnegie Melon University's SphinxI.

Briefly, a speech recognition grammar generated by a unified grammar compiler (not shown), such as the one described in U.S. Ser. No. 08/235,046 is loaded into speech recognizer 410 during initialization. Next, speech recognizer 410 matches the input digitized speech to sequences of phonemes as they sound in various contexts using a Hidden Markoff Model that represents the low-level characteristics of the sounds. Speech recognizer 410 then produces a best-guess word sequence, shown in FIG. 4 as the validated word sequences, by using an internal speech-recognition finite-state machine constructed from the phoneme sequences derived from speech recognition grammar.

In this embodiment, the natural language processor 420 named SWIFTUS (SoftWare Instead of Fastus for Text UnderStanding) was written at Sun Microsystems Laboratories, Inc., based on a published description of a natural language processor called Fastus developed by Jerry Hobbs at SRI International, Stanford, Calif. Further details on natural language processor 420 can be found in U.S. Ser. No. 08/235,046. In general, natural language processor 420 generates command summary structures corresponding to the validated word sequences, i.e., selecting and interpreting the acceptable word combinations from among the permissible word combinations using the enabled rules of grammar database 110.

Application command translator 430 uses the command summary structures produced by the natural language processor 420 to generate commands to control the system.

D. Hardware of Data Processing System

Figure 5:
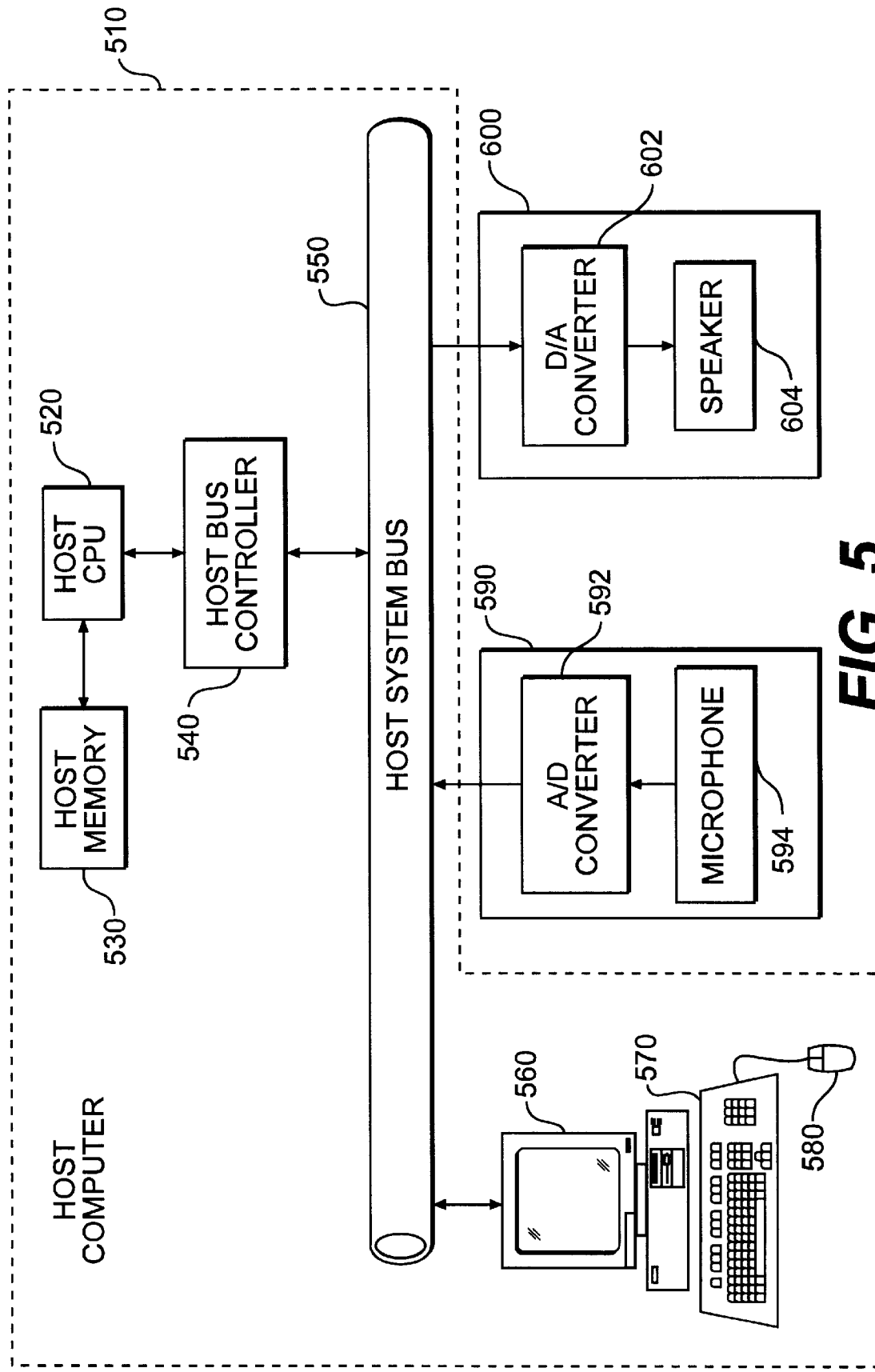
FIG. 5 is a diagram of a data processing system that can be used in an implementation of the present invention.

FIG. 5 is a diagram of a data processing system consistent with the present invention. In accordance with an embodiment of the present invention as shown in FIG. 5, the speech interpreter is implemented on a general purpose host computer 510 that includes central processing unit (CPU), host memory 530, host bus controller 540, host system bus 550, monitor 560, keyboard 570 and mouse 580. An acoustic input device 590 having an analog-to-digital (A/D) converter 592 and microphone 594 is coupled to system bus 550.

Host computer 510 is also coupled to an acoustic output device 600 having a digital-to-analog converter (DAC) 602 and an audio speaker 604. In some embodiments, the conversion of analog speech to and from digital form is accomplished remotely from host computer 510, for example, by coupling digital ISDN telephony lines to system bus 550 of host computer 510 via an appropriate adapter (not shown).

E. Conclusion

To overcome the shortcomings of conventional speech recognition systems, the present invention automatically updates a lexicon to include the logical extensions of the database of acceptable items using a grammar with certain lexical feature tests that can be disabled during the collection of information for the update process. The modified lexicon is then be used with all of the grammar's lexical feature tests switched on to parse spoken input. In this manner, the system recognizes only the acceptable word sequences, given the data used to initially mark the lexicon.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A teaching process for automatically modifying a lexicon database containing words and associated lexical properties, the method comprising the steps, performed by a processor, of:

providing lexical property tests having rules and related constraints for combining words in acceptable word combinations for a speech recognition process;

identifying certain constraints as switchable constraints, wherein switchable constraints are enabled during the speech recognition process and disabled during the teaching process;

receiving exemplary clauses containing permissible word combinations for the speech recognition process;

parsing the exemplary clauses using applicable lexical property tests; and updating the lexicon database with additional lexical properties for selected words in the lexicon database corresponding to words in the received exemplary clauses.

2. The method of claim 1, wherein the updating step includes the substep of:

assigning the additional lexical properties to the corresponding words of the lexicon database.

3. The method of claim 1, wherein the parsing step includes the substep of:

indexing the lexical properties corresponding to the exemplary clauses.

4. The method of claim 1 further comprising the step of:

compiling a grammar database with all constraints of the lexical property tests enabled and the lexicon database with the assigned lexical properties to produce a speech recognition grammar that embodies constraints of the lexical property tests and the lexical properties.

5. An apparatus for performing a teaching process associated with a lexicon database containing words and associated lexical properties, comprising:

a grammar database comprised of lexical property tests having rules and related constraints for combining words in acceptable word combinations for speech recognition, wherein certain constraints are switchable constraints, and switchable constraints are enabled during speech recognition and disabled during the teaching process;

a receiver configured to receive exemplary clauses containing permissible word combinations for speech recognition;

a parser configured to parse the exemplary clauses using applicable lexical property tests; and a modifier configured to update the lexicon database with additional lexical properties for selected words in the lexicon database, corresponding to words in the received exemplary clauses.

6. The apparatus of claim 5, wherein the modifier includes:

an allocator configured to assign the additional lexical properties to the corresponding words of the lexicon database.

7. The apparatus of claim 5, wherein the parser includes:

an indexing component configured to index the lexical properties corresponding to information derived from the exemplary clauses.

8. The apparatus of claim 5 further comprising:

a compiler configured to compile the grammar database with all constraints of the lexical property tests enabled and the lexicon database with the assigned lexical properties to produce a grammar that embodies constraints of the lexical property tests and the lexical properties.

9. A computer program product comprising: a computer usable medium having computer readable code embodied therein for performing a teaching process associated with a lexicon database containing words and associated lexical properties, the computer usable medium comprising:

a grammar database comprised of lexical property tests having rules and related constraints for combining words in acceptable word combinations for speech recognition, wherein certain constraints are switchable constraints, and switchable constraints are enabled during the speech recognition process and disabled during the teaching process a receiving module configured to receive exemplary clauses containing permissible word combinations for speech recognition;

a parser configured to parse the exemplary clauses using applicable lexical property tests; and an updating module configured to update the lexicon database with additional lexical properties for selected words in the lexicon database corresponding to words in the received exemplary clauses.

10. The computer usable medium of claim 9, wherein the updating module includes:

an assigning module configured to assign the additional lexical properties to the corresponding words of the lexicon database.

11. The computer usable medium of claim 9, wherein the parser includes:

an indexing module configured to index the lexical properties corresponding to the exemplary clauses.

12. The computer usable medium of claim 9 further comprising:

a compiler module configured to compile the grammar database with all of the constraints of the lexical property tests enabled and the lexicon database with the assigned lexical properties to produce a grammar that embodies constraints of the lexical property tests and the lexical properties.

13. A speech recognition method using a lexicon database containing words and associated lexical properties, including word types and features, and a grammar database with lexical property tests defining rules and related constraints for combining words in recognizable word combinations, and wherein switchable constraints are disabled during a teaching process, the method comprising the steps, performed by a processor, of:

receiving input speech patterns containing a word sequence; and parsing the word sequence, wherein the parsing step comprises the substeps of identifying word types associated with the words of the word sequence, selecting lexical property tests applicable to the word sequence based on the identified word types, and applying the selected lexical property tests with any associated switchable constraints in the enabled state to limit the recognizable word combinations based on features associated with the words in the word sequence.

14. The method of claim 13, further comprising the steps of:

identifying a command corresponding to the parsed word sequence; and initiating the command to instruct the processor to perform an operation.

15. A speech recognition apparatus having a lexicon database containing words and associated lexical properties, including word types and features, and a grammar database with lexical property tests defining rules and related constraints for combining words in recognizable word combinations, and wherein switchable constraints are disabled during a teaching process, the apparatus comprising:

a receiver configured to receive input speech patterns containing a word sequence; and a parser configured to parse the word sequence, wherein the parser comprises a component configured to identify word types associated with the words of the word sequence, a component configured to select lexical property tests applicable to the word sequence based on the identified word types, and a component configured to apply the selected lexical property tests with any associated switchable constraints in the enabled state to limit the recognizable word combinations based on features associated with the words in the word sequence.

16. The apparatus of claim 15, further comprising;

a classifier configured to identify a command corresponding to the parsed word sequence; and an initiator configured to initiate the command to instruct the processor to perform an operation.

17. A computer program product comprising:

a computer usable medium having computer readable code embodied therein, comprising:

a lexicon database containing words and associated lexical properties, including word types and features;

a grammar database with lexical property tests defining rules and related constraints for combining words in recognizable word combinations, wherein switchable constraints are disabled during a teaching process;

a receiving module configured to receive input speech patterns containing a word sequence; and a parsing module configured to parse the word sequence, wherein the parsing module comprises a module configured to identify word types associated with the words of the word sequence, a module configured to select lexical property tests applicable to the word sequence based on the identified word types, and a module configured to apply the selected lexical property tests with any associated switchable constraints in the enabled state to limit the recognizable word combinations based on features associated with the words in the word sequence.

18. The computer usable medium of claim 17, further comprising:

an identifying module configured to identify a command corresponding to the parsed word sequence; and an initiating module configured to initiate the command to instruct the processor to perform an operation.

19. A computer readable medium containing instructions for causing a computer system to perform a teaching process associated with (modify) a lexicon database containing words and associated lexical properties, by:

providing a grammar database comprised of lexical property tests having rules and related constraints for combining words in acceptable word combination$ for speech recognition;

identifying certain constraints as switchable constraints, wherein switchable constraints are enabled during speech recognition and disabled during the teaching process;

receiving exemplary clauses containing permissible word combinations for speech recognition;

parsing the exemplary clauses using applicable lexical property tests;

updating the lexicon database with additional lexical properties for selected words in the lexicon database corresponding to words in the received exemplary clauses.

20. A computer readable medium containing instructions for causing a computer system having a grammar database with lexical property tests defining rules and related constraints for combining words in recognizable word combinations, wherein switchable constraints are disabled during a teaching process, to recognize input speech patterns, by:

receiving input speech patterns containing a word sequence; and parsing the word sequence by identifying word types associated with the words of the word sequence, selecting lexical property tests applicable to the word sequence based on the identified word types, and applying the selected lexical property tests with any associated switchable constraints in the enabled state to limit the recognizable word combinations based on features associated with the words in the word sequence.

21. A method for developing a grammar database having lexical property tests for use in a speech recognition process using a lexicon database containing words and associated lexical properties, the method comprising the steps, performed by a processor, of:

receiving exemplary clauses containing types of word sequences to be understood during a speech recognition process;

identifying additional lexical properties for selected words in the lexicon database corresponding to words in the received exemplary clauses using the lexical property tests of the grammar database by parsing the exemplary clauses with switchable constraints of the lexical property tests disabled to produce an index of the lexical properties for words in the exemplary clauses; updating the lexicon database with the additional lexical properties by assigning the additional lexical properties to the corresponding words of the lexicon database; and compiling the lexicon database and the grammar database with the switchable constraints of the lexical property tests enabled to produce a new grammar database that embodies constraints of the lexical property tests and the lexical properties of the lexicon database including the additional lexical properties.

* * * * *